US006209575B1

(12) United States Patent
Graziano et al.

(10) Patent No.: US 6,209,575 B1
(45) Date of Patent: Apr. 3, 2001

(54) TAMPER PROOF SET SCREW

(75) Inventors: Stephen J. Graziano, Washingtonville, NY (US); Richard M. Ruggiero, Sr., Danbury, CT (US); James Vichiconti, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/189,308

(22) Filed: Nov. 10, 1998

(51) Int. Cl.[7] ....................... F16K 35/06
(52) U.S. Cl. ....................... 137/383; 70/229
(58) Field of Search ....................... 70/34, 229, 230, 70/231; 137/383

(56) References Cited

U.S. PATENT DOCUMENTS

| | | | | |
|---|---|---|---|---|
| 3,170,668 | * | 2/1965 | Aulisa | 251/193 |
| 3,977,221 | | 8/1976 | Foote . | |
| 4,576,021 | * | 3/1986 | Holden | 70/34 |
| 4,751,831 | * | 6/1988 | Morris, Jr. et al. | 70/159 |

* cited by examiner

*Primary Examiner*—John Fox

(57) ABSTRACT

A device for preventing unauthorized access to a rotating shaft. More particularly, an apparatus is provided to prevent unintended and unauthorized operation of a rotating shaft by encasing a vulnerable portion of the shaft in a standard pin type lock which renders the shaft impervious to unauthorized operation. It is intended that the rotating shaft cannot be operated unless it is unlocked and a tool is applied to a portion thereof.

5 Claims, 7 Drawing Sheets

TAMPER PROOF SET SCREW

BACKGROUND OF THE INVENTION

1. Field of the Invention

The present invention relates to locking devices and, more particularly, to an apparatus for preventing unauthorized access to a rotating shaft.

2. Discussion of the Prior Art

Standard industrial exhaust trunk blast gates are used extensively as a means to control the passage of exhaust air volume. An industrial exhaust trunk blast gate of the prior art is shown in detail in FIG. 1. The blast gate 1, illustrated in FIG. 1, is constructed as two components, a stationary member 2 (exhaust gate housing), and a sliding member 3 (exhaust gate), which slides in relation to the stationary member 2. In a typical application, the stationary member 2 is fixed in an exhaust duct in a path through which the exhaust air volume of interest will pass. The stationary member 2 is fixed in place by connecting rigid ductwork to each side of the aperture 4. Once in place, the sliding member 3 is then positioned relative to the stationary member 2 to cover some portion of the aperture through which the exhaust air will flow. The extent to which the aperture 4 is covered by the sliding member 3 is continuously adjustable from fully exposed to fully closed. Once the desired position of the sliding member 3 in relation to the stationary member 2 is determined, a standard set screw 7 is employed as a pressure fitting mechanism to fix the position of the sliding member. The set screw 16 is threaded into a mating threaded hole 6 in the stationary member with sufficient engagement so as to impinge the sliding member, thereby holding the sliding member in place at the desired position.

Additional securing means are sometimes employed to prevent unauthorized access by locking the sliding member 3 in place relative to the stationary member 2. Because the set screw is vulnerable to unintended and unauthorized operation the additional locking means is utilized as an adjunct to prevent such occurrences. A pin type lock, described at FIG. 2, is typically employed as a locking means.

Referring now to FIG. 2 there is illustrated an exemplary pin type lock, well known in the art, such as one available from the Wilson Bohannan Company pin lock type 220ka2 16343a w/078. The lock is comprised of a locking pin 13, a lock body 11 having a recess 14 for receiving the locking pin 13. The lock pin having pin portion 8, a contoured surface 12, a shaft portion 9, and a head portion 10. The operational aspects of the pin lock will be described below.

Referring now to FIGS. 2 and 3, when a locking mechanism is utilized as an adjunct to prevent unauthorized tampering of the exhaust gate assembly 1, a structural modification to both the stationary 2 and sliding 3 members is required. In FIG. 3 equal diameter holes are shown drilled into the face of both the stationary 2 and sliding 3 members to accommodate insertion of the locking pin through both members. A single hole 7 is all that is required to be drilled in the stationary member 2. The sliding member 2, however, typically may require a multiplicity of drilled holes 8(*a–c*) to accommodate the various desired aperture exposures. That is, the system for which the exhaust gate was designed may be required to have the aperture 4 open or closed to greater or lesser degrees depending upon changing system requirements. In general, any number of holes may be drilled into the sliding member 3 to accommodate the required aperture exposure.

The operational aspects of the locking mechanism of the prior art will be discussed with reference to FIGS. 2, 3 and 4. In FIG. 4, the sliding member 3 would first be aligned with the stationary member 2 such that one of a plurality of pinlock holes 8(*a–c*) in the sliding member would coincide with the single pinlock hole 7 in the stationary member. The particular hole chosen for alignment on the sliding member 2 fixes the degree of exposure in the exhaust aperture 4. FIG. 4 illustrates the selection of hole 8*c*, by way of example, for alignment with pinlock hole 7 on the stationary member 2. Selecting hole 8*c* for alignment results in an aperture 4 exposure defined by numeral 15. Once aligned, the locking pin 13, illustrated in FIG. 2, would then be inserted through aligned pinlock holes 7 and 8*c*, respectively. The pin portion 8 of the locking pin 13 would then be inserted into the pinlock body 11 through an recess 14 in the base end of the pinlock body 11. The recess 14 is of sufficient diameter to receive the pin side 8 of the locking pin 13.

A disadvantage of having to drill multiple holes (i.e. 8(*a–c*)) into the sliding member 2 is that once a particular hole on the sliding member is chosen for the purpose of aligning and locking the two members in place, some portion of the unaligned holes 8 may be located inside the aperture 4 of the stationary member. FIG. 4 illustrates this situation. Specifically, FIG. 4 illustrates the selection of hole 8*c* for alignment. The selection of hole 8*c* for alignment causes the two remaining unaligned holes, 8*a* and 8*b*, to be positioned inside the aperture 4 to varying degrees. It is shown at FIG. 4 that hole 8*a* is fully contained within the aperture 4, while hole 8*b* is only partially contained within the aperture 4. It is apparent that the desired aperture exposure 15, as determined by the selection of aligning hole 8*c*, will be compromised to the extent that holes 8*a* and 8*c* result in additional exposed surface area. The additional exposed surface area is undesirable for a number of reasons including; (1.) if the sliding member were positioned to be fully closed, exhaust air would still pass through the aperture 4; (2.) There is an associated cost associated with the accumulative lost exhaust air over time, (3.) Maintaining control over a desired flow volume would be difficult, and precise adjustments are difficult to achieve, (4.) The structural integrity of the blast gate is compromised.

It would therefore be desirable to be able to secure the sliding member in place relative to the stationary member 2 so as to prevent unauthorized and unintended adjustment of the set screw without requiring mechanical modification to either the sliding or stationary members.

SUMMARY OF THE INVENTION

The present invention has been accomplished to eliminate the aforesaid disadvantages and problems. It is therefore an object of the present invention to provide an apparatus to prevent unintended and unauthorized operation of a set screw by encasing a vulnerable portion of the set screw in a standard pin type lock which renders the set screw impervious to unauthorized operation.

According to one aspect of the invention there is provided a tamper proof set screw including a threaded end portion, a contoured portion and a pin end portion. In operation, the threaded end is threaded through a threaded hole in a stationary member to fully engage, and thereby prevent movement of a sliding member, that slides in relation to the stationary member. Once engaged the sliding member is held in position relative to the stationary member and the pin portion of the set screw is then inserted into a recess of a pin type lock and locked therein to form a combined assembly.

The lock freely turns on the set screw thereby preventing unauthorized disengagement of the threaded end portion of the set screw with the sliding member.

According to the present invention there is provided an apparatus for locking a set screw including: a first member, a second member for moving relative to the first member, a set screw threadedly engaging the first member, the set screw for engaging the second member to secure a position of the second member relative to the first member, and a locking device for receiving a portion of the set screw extending from the first member, the locking device being permitted to rotate relative to the set screw such that threaded engagement with the first member is maintained.

DETAILED DESCRIPTION OF PREFERRED EMBODIMENTS

While certain preferred implementations are described herein, it is to be understood that the teachings of the present invention are susceptible of more general usage.

Figure 5:
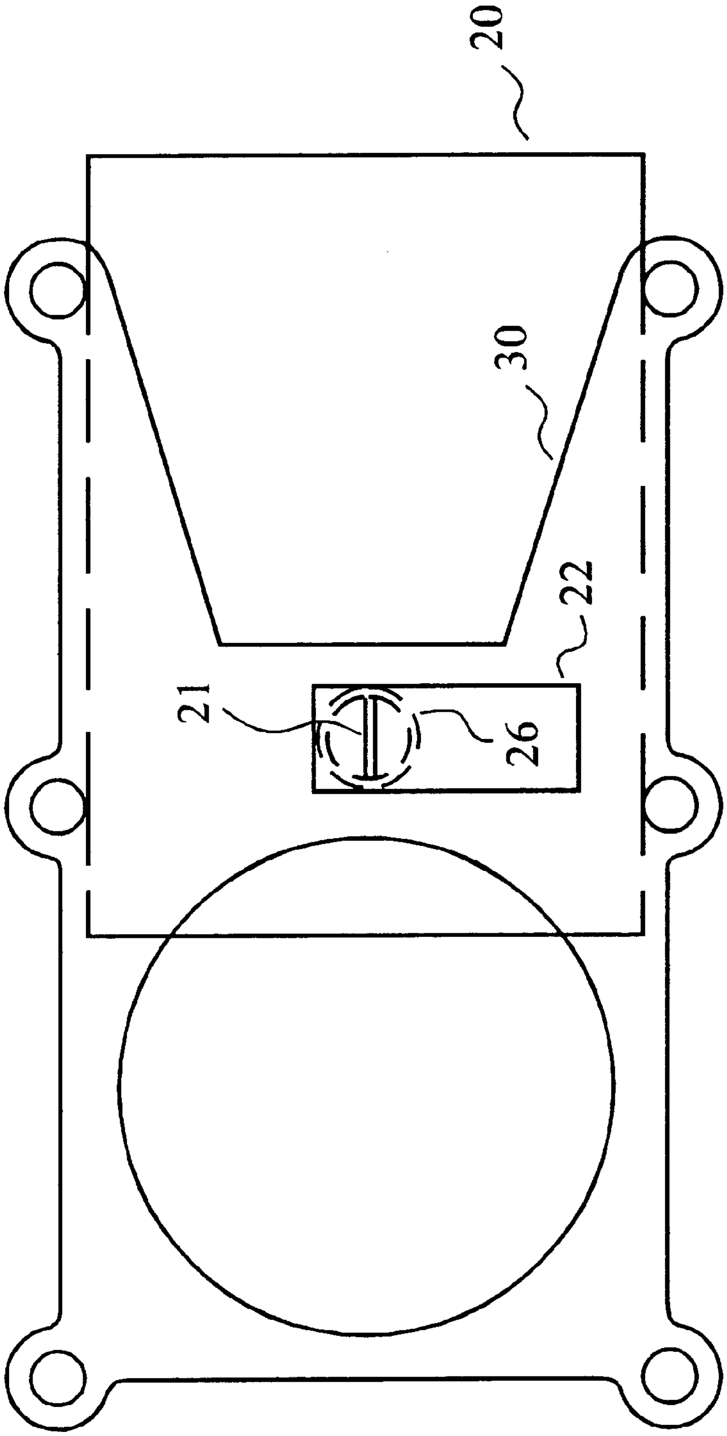
FIG. 5 is a illustration of an industrial exhaust gate in accordance with the present invention.
Figure 6:
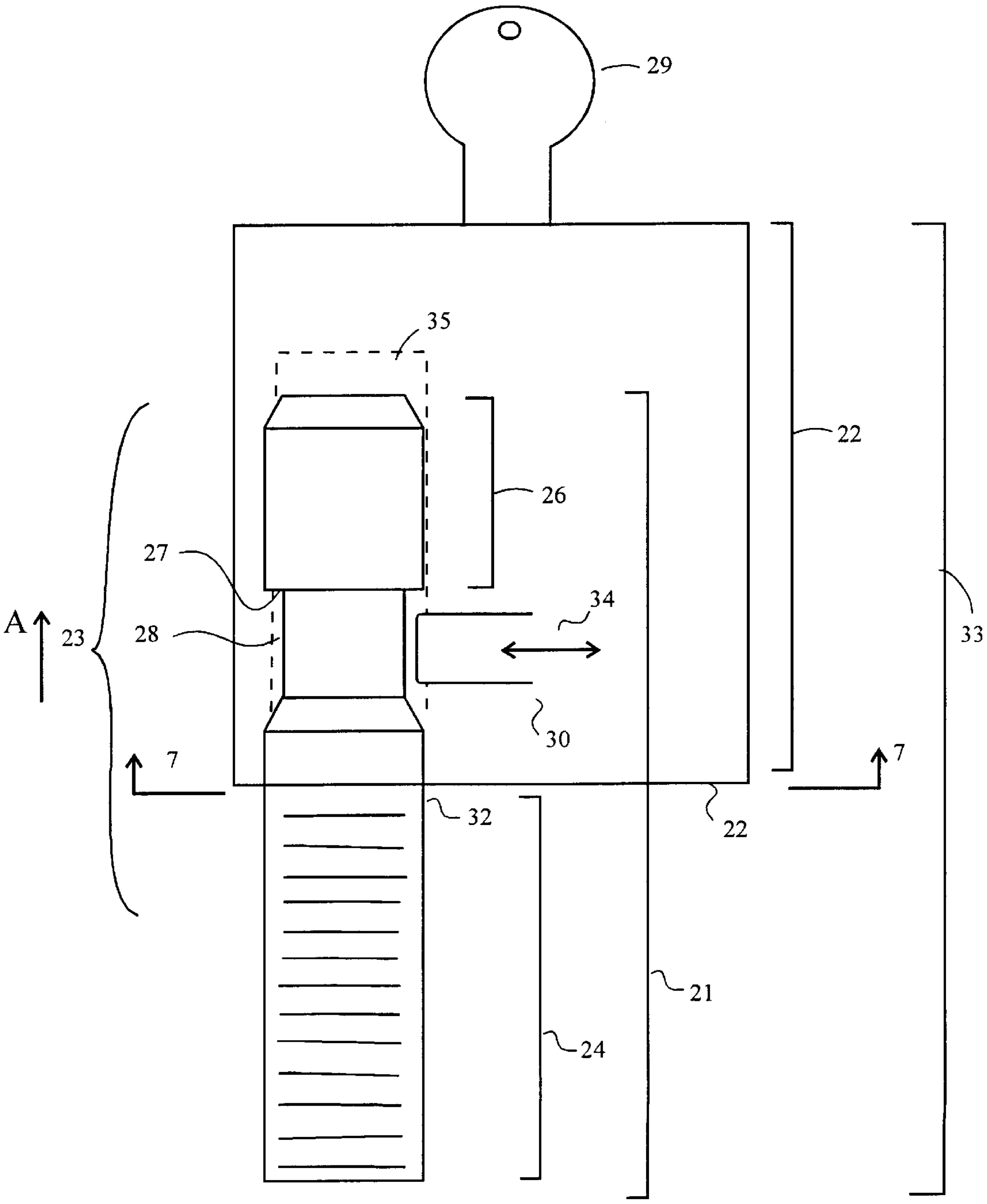
FIG. 6 is a illustration of a tamper proof set screw in accordance with the present invention.
Figure 7:
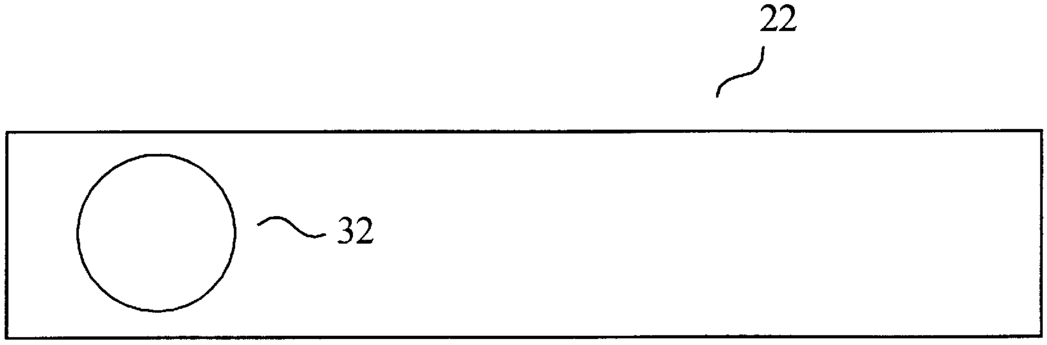
FIG. 7 is a cross-sectional view of the base end of the pin type lock.

With reference now to the drawings, and in particular FIGS. 5 to 7, a new and improved tamper proof set screw embodying the principles of the present invention will be described.

Referring now to FIGS. 5 and 6, an industrial exhaust gate is shown including a stationary portion 30 and a sliding portion 20. The stationary portion 30 further includes a hole 26 with inner threads for receiving a set screw 21. FIG. 6 illustrates a tamper proof set screw 21 having a threaded portion 24, a pin portion 26, and an engagement portion 28. A contour 27 defines the boundary between the engagement portion 28 and the pin portion 26. The tamper proof set screw 21 of the present invention performs several functions including securing the sliding member 20 relative to the stationary member 30 to prevent unauthorized and unintended movement of the sliding member 20 by frictional coupling. To further secure the sliding member 20 relative to the stationary member 30 additional securing means are contemplated in addition to the frictional coupling. For example, in one embodiment the engagement portion 28 could terminate in a tapered end, sized appropriately for mating with an aligned indentation in the sliding member 20. In an alternate embodiment, the sliding member may include a plurality of dimples on its mating surface. In yet another embodiment, a bayonet coupling may be substituted for the threaded engagement contemplated by the preferred embodiment. In another embodiment, the engagement portion 28 could terminate in a concave tip end.

The pin portion 26 of the set screw 21 is adapted to receive an adjustment tool. The adaptation may be configured to receive a flathead screwdriver, wrench, phillips head screwdriver, allen wrench. Other adaptations, not expressly enumerated, are within the intended scope of the present invention.

Figure 1:
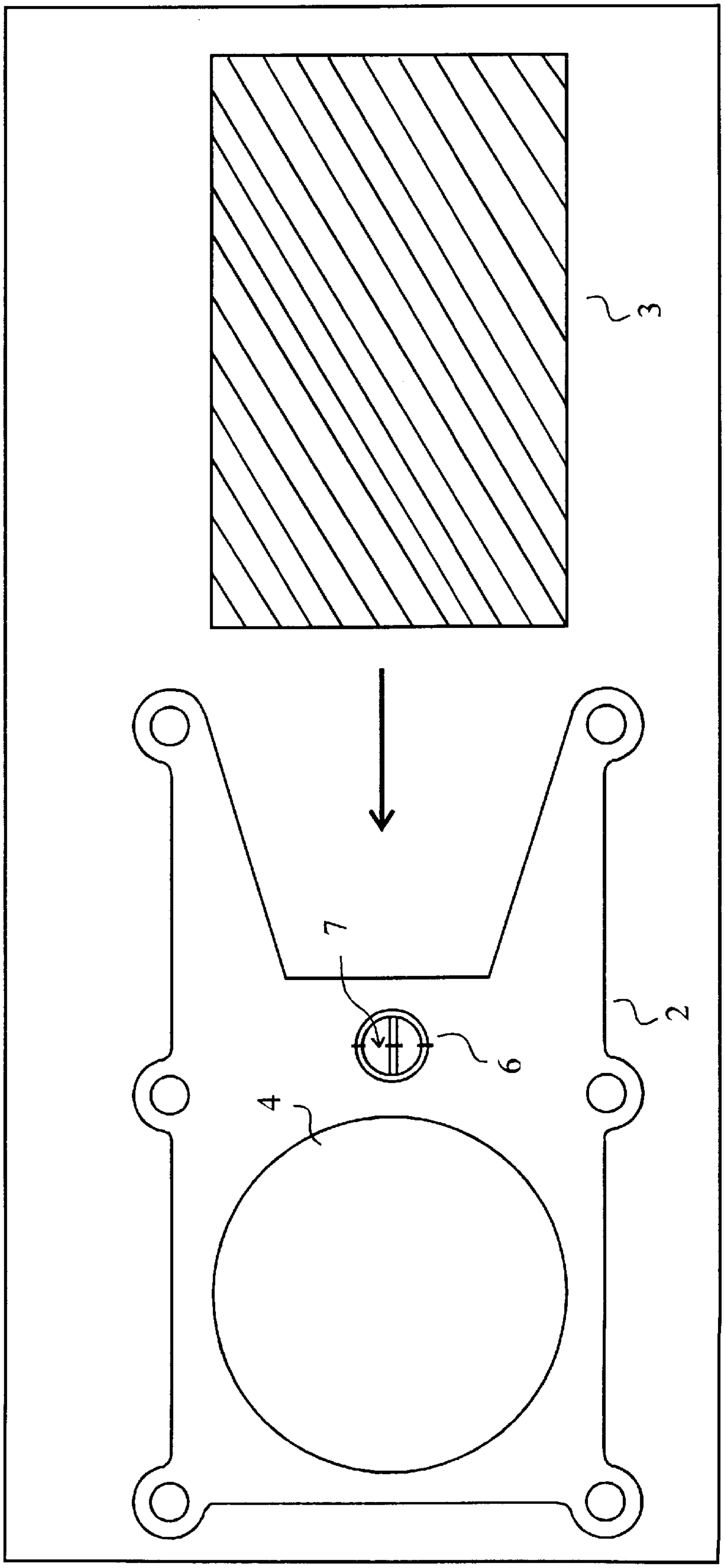
FIG. 1 (PRIOR ART)
FIG. 1 is a prior art illustration of a standard industrial exhaust gate.
Figure 2:
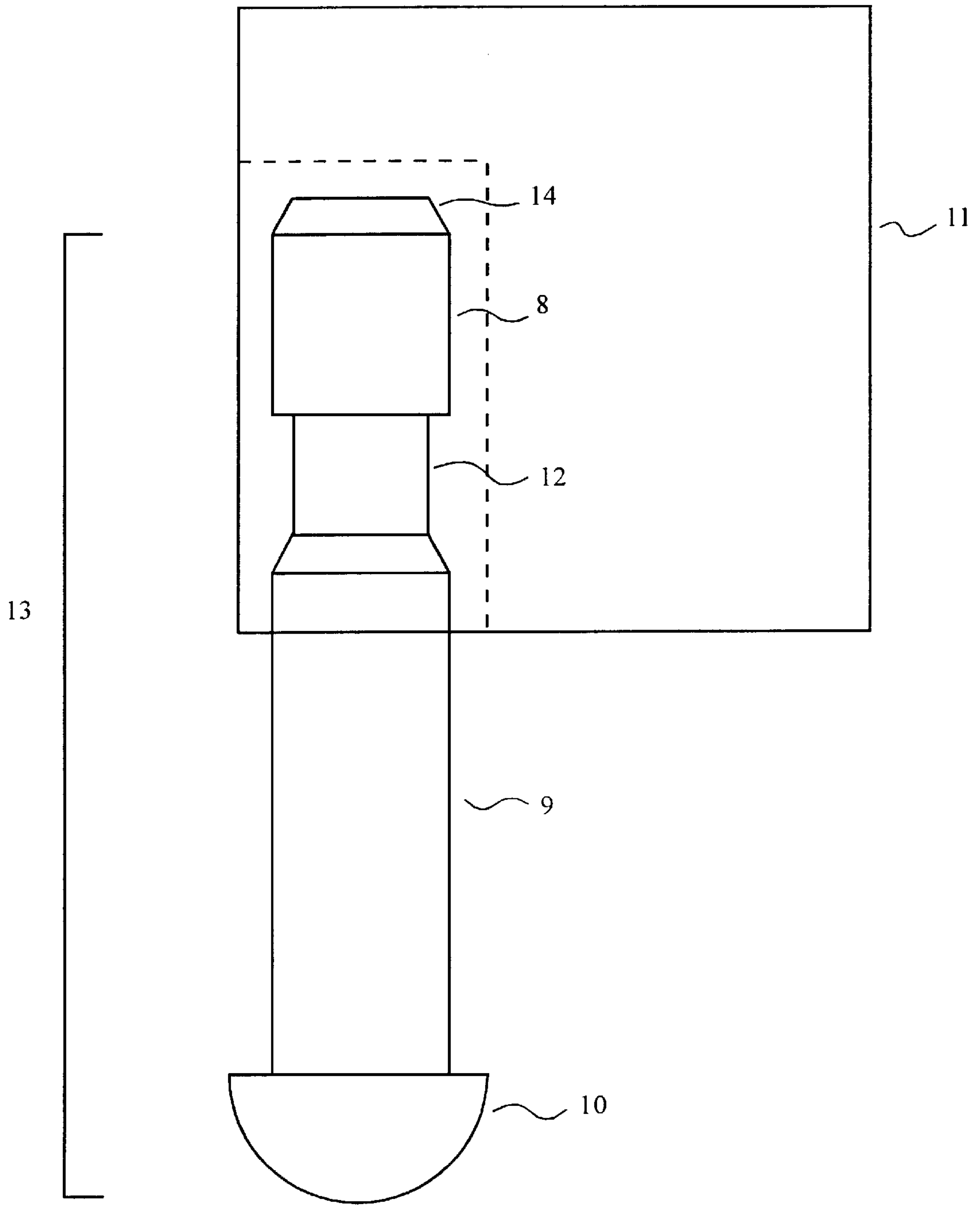
FIG. 2 (PRIOR ART)
FIG. 2 is a prior art illustration of an exemplary pin lock.
Figure 3:
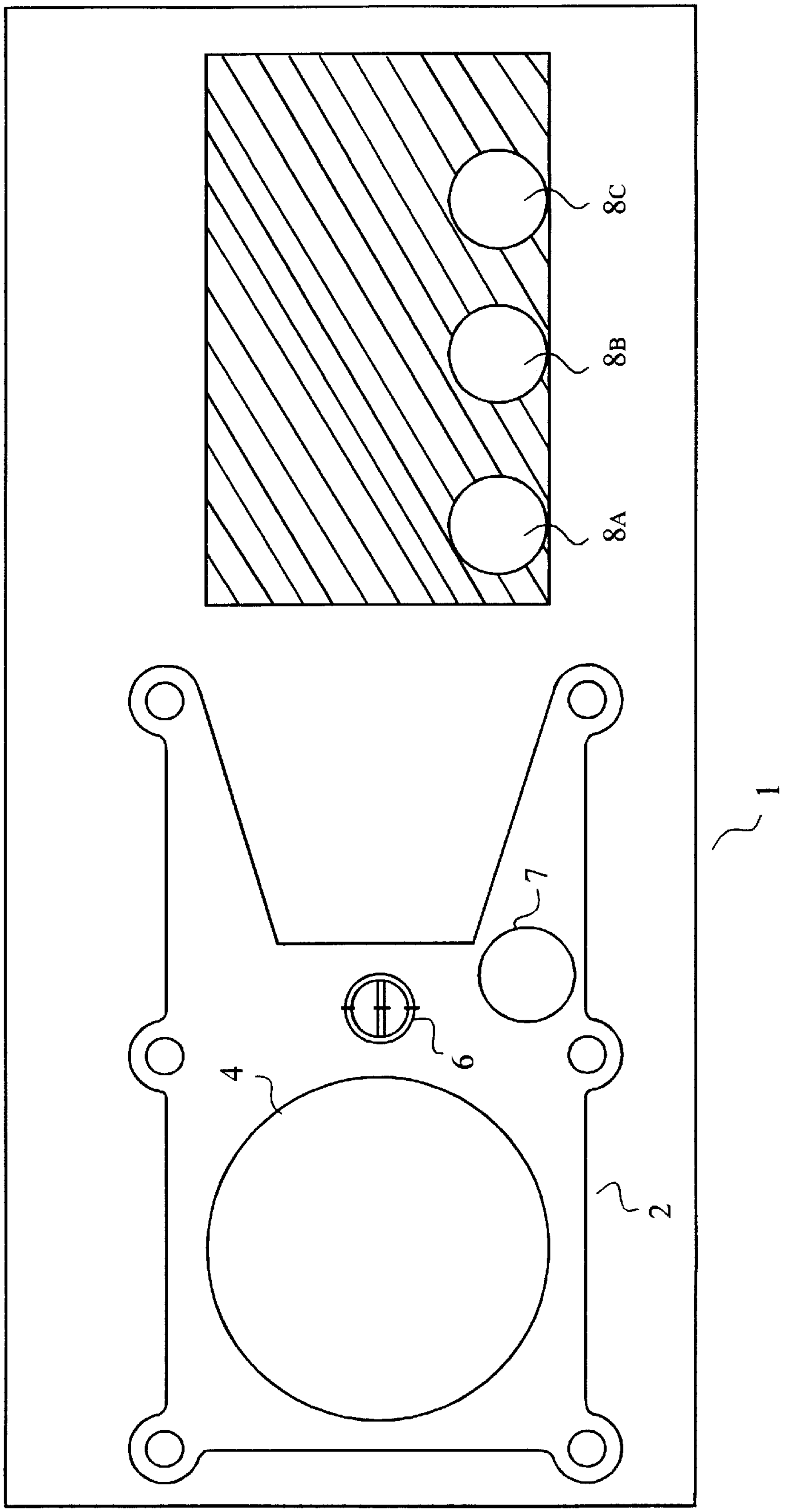
FIG. 3 (PRIOR ART)
FIG. 3 is a prior art illustration of a modified industrial exhaust gate, modified for use with a pin lock.
Figure 4:
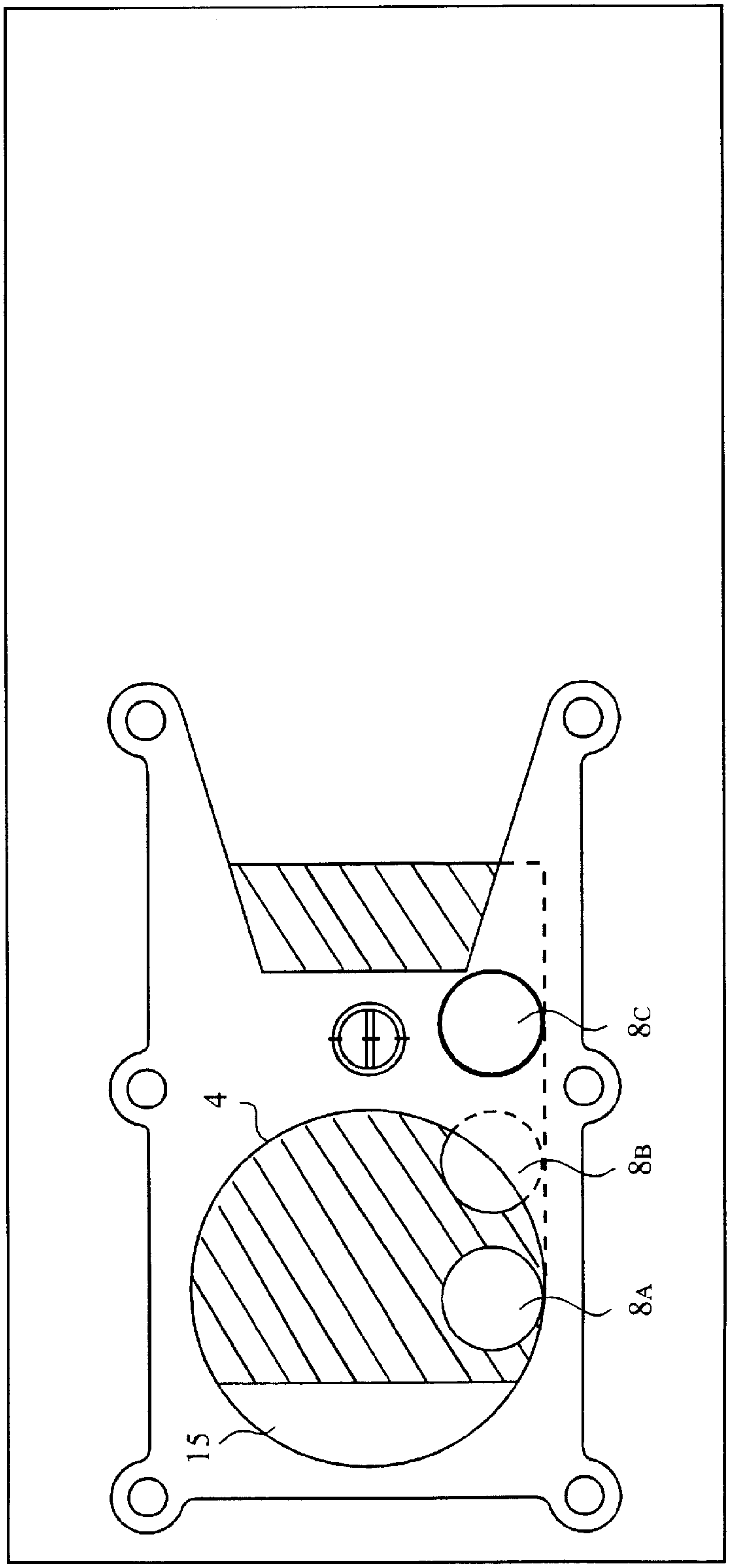
FIG. 4 (PRIOR ART)
FIG. 4 is a prior art illustration of the modified exhaust gate of FIG. 3 during operation.

In accordance with the teachings of the present invention, a vulnerable portion 23 of the set screw 21 is configured and dimensioned to fit in a standard pin type lock 22 to guard against undesired access to the set screw 21. The pin lock assembly 33 described at FIG. 6 requires a key 29 for proper operation. The pin type lock 33 may be of a type described by FIG. 2, however, other lock assemblies, for example, combination, slider, digit, and rotary locks, are all within the scope of the present invention.

Referring now to FIGS. 6 and 7, the pin portion 26 of the set screw 21 is configured to fit into an recess 32 of a base end 22 of the pin type lock 33 for engagement. Turning the key 29 causes a spring loaded engagement member 30 to recede from the recess 35 thereby permitting the passage of the pin portion 26 into the recess 35. Releasing the key causes the spring loaded engagement member 30 to move partially into the interior of the recess 35 engaging the contoured surface 27 of the set screw and thereby preventing the set screw from disengagement with the recess 35.

When the tamper proof set screw is functioning in the standard industrial trunk blast gate lock assemblage, which is merely representative, it is intended that the set screw may only be turned for engaging it with or disengaging it from the sliding portion 14 by possessing a key 30 to release the pin lock 22 from engagement with the pin side 26 of the set screw 21.

Without access to the key, when the pin side 26 of the standard pin type lock 22 is engaged with the tamper proof set screw 20, the pin lock and screw freely turn on each other thereby prohibiting access to the set screw.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A lockable exhaust trunk blast gate comprising:

a stationary plate;

a sliding plate for moving relative to the stationary plate;

a set screw including a threaded portion and a pin portion, wherein an end of the threaded portion frictionally secures a position of the sliding plate relative to the stationary plate, and the pin portion is adapted for receiving an adjustment tool; and a removable pin type lock being detachable from the set screw comprising a recess for receiving a vulnerable portion of the set screw which extends from the stationary plate such that the vulnerable portion cannot be accessed, the pin type lock being permitted to rotate relative to the set screw such that threaded engagement with the stationary plate is maintained, wherein access to the set screw is prevented by turning a key in the pin type lock so that an engagement member operatively attached to the said removable pin type lock moves partially into said recess to engage the set screw and thereby prevent the set screw from disengaging with the recess.

2. An apparatus comprising:

a stationary member having a threaded hole;

a sliding member for slidably moving in relation to said stationary member a set screw having a first portion and a second portion, said first portion threadedly received in said threaded hole, the set screw for restricting movement of said sliding member by applying a force against said sliding member, said second portion extending from said stationary member and including a pin side adapted for receiving an adjustment tool; and a removable lock having a recess in a bottom face for insertion of said second portion such that said second portion cannot be accessed, wherein said removable lock freely rotates on said second portion when the lock is lockably engaged, thereby preventing the set screw from being operated in a normal manner.

3. The apparatus of claim 1, wherein said stationary member further comprises an aperture, said aperture having a degree of exposure defined only by a relative position of said sliding member to said stationary member.

4. The apparatus of claim 3, wherein said degree of aperture exposure is adjustable from completely open to completely closed by frictionally coupling the set screw with the sliding member.

5. A tamper-proof set screw for securing an exhaust trunk blast gate to control fluid flow comprising:

a threaded end for threading through a gate housing to frictionally secure a sliding exhaust gate which slides relative to the gate housing to prevent unintended movement of the sliding exhaust gate; and a pin side adapted to receive an adjustment tool and including a contoured surface, wherein said pin side protrudes from said gate housing and is insertable into a recess of a removable pin type lock having an engagement member, whereby when the engagement member of the pin type lock is engaged with the contoured surface of the pin side, the pin type lock and the set screw freely turn on each other to prohibit access to the set screw.

* * * * *

UNITED STATES PATENT AND TRADEMARK OFFICE

CERTIFICATE OF CORRECTION

PATENT NO. : 6,209,575 B1
DATED : April 3, 2001
INVENTOR(S) : Graziano et al.

It is certified that error appears in the above-identified patent and that said Letters Patent is hereby corrected as shown below:

Column 5, claim 3,
Line 16, delete "1", insert -- 2 --.

Signed and Sealed this

Sixth Day of November, 2001

*Attest:*

Nicholas P. Godici

NICHOLAS P. GODICI

*Attesting Officer*

*Acting Director of the United States Patent and Trademark Office*